G. V. BAILLARD.
VEHICLE TIRE.
APPLICATION FILED JULY 30, 1912.

1,101,828.

Patented June 30, 1914.
2 SHEETS—SHEET 1.

WITNESSES
Harry E. Hebig
Minnie S. Miller

INVENTOR
George V. Baillard
ATTORNEY

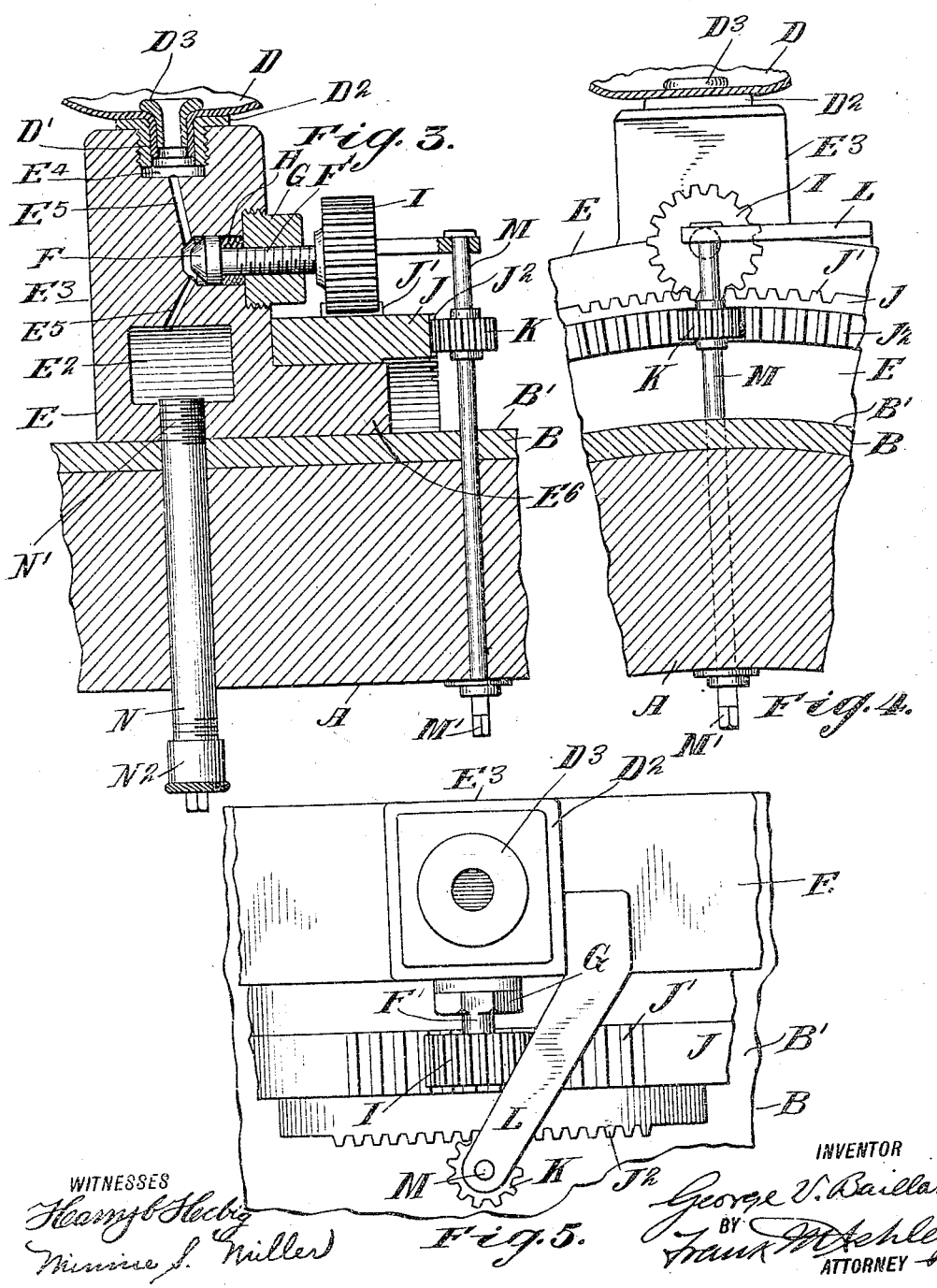

UNITED STATES PATENT OFFICE.

GEORGE V. BAILLARD, OF NEW YORK, N. Y.

VEHICLE-TIRE.

1,101,828.

Specification of Letters Patent. Patented June 30, 1914.

Application filed July 30, 1912. Serial No. 712,224.

*To all whom it may concern:*

Be it known that I, GEORGE V. BAILLARD, a citizen of the United States, and a resident of New York city, in the county of New York and State of New York, have invented certain new and useful Improvements in Vehicle-Tires, of which the following is a specification.

My invention relates to vehicle tires, and the object of my invention is to provide a tire for vehicles of the pneumatic type having a plurality of expansible sacks which may be inflated with air simultaneously, and having means for closing the communicating passages to provide a tire having separate pneumatic chambers located adjacent to each other and extending all around the periphery to form a continuous tread.

Further objects will be pointed out hereinafter and the novel features of construction pointed out in the claims.

Figure 1:
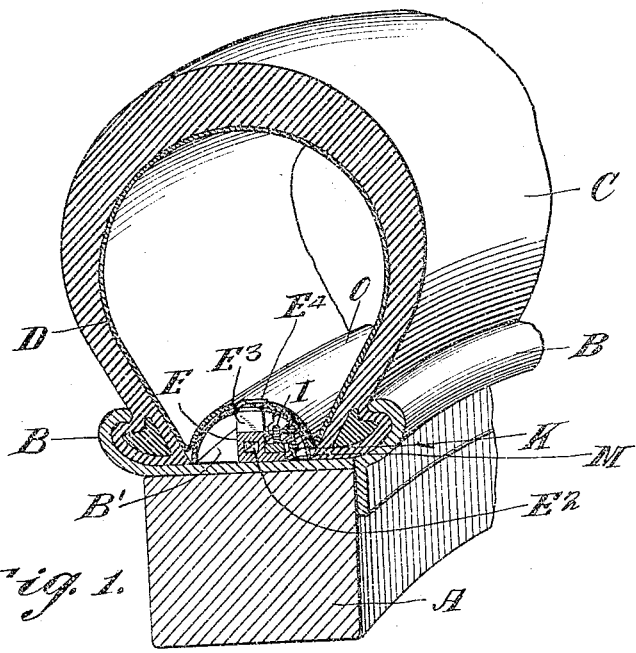
Figure 2:
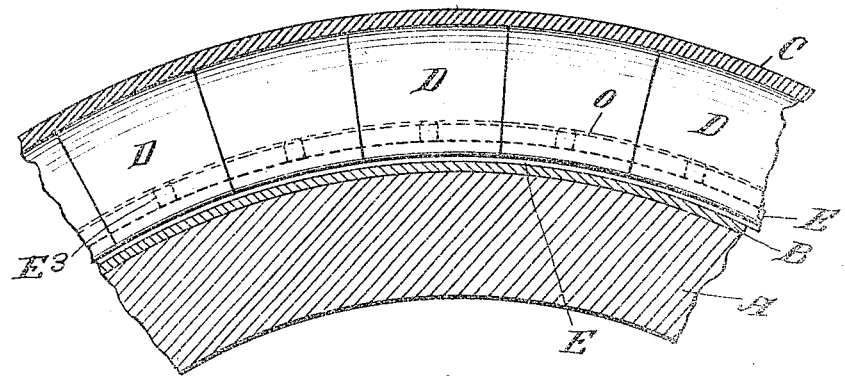
Figure 6:
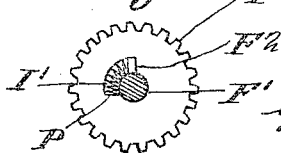

Referring to the drawings which form a part of this specification Figure 1 is a cross sectional view of a tire embodying my invention. Fig. 2 is a longitudinal view shown partly in section of a portion of the tire mounted on a section of a wheel. Fig. 3 is a cross sectional view through the conduit and one of the passages leading to one of the tire chambers, illustrated on a large scale. Fig. 4 is an exterior side view of the construction shown in Fig. 3. Fig. 5 is a plan view of the construction shown in Fig. 4 with the sack removed. Fig. 6 is a detail of the yieldable connection between the pinions and valve stems.

A, indicates a portion of the felly of a wheel, and B, indicates a metal rim carried thereby, and well known in this art.

C, indicates a tire shoe of usual construction, and D—D etc. indicate separate sacks or inner tube sections, preferably made of rubber or other suitable expansible flexible material. These sacks are usually formed in cross section as illustrated in Figs. 1 and 2, and are provided on their under side with short tubular projections D′.

E, indicates a casting of aluminum or other suitable metal, which is suitably split and is formed circular, its inner periphery fitting the outer surface B′ of the rim B, and the casting may be sprung laterally over the side of the rim to its position therein, as will be readily understood. The casting E is provided with a conduit $E^2$ which extends from one end to the other, it being understood that said ends are closed. The casting is provided with outwardly projecting nipples $E^3$—$E^3$ etc. spaced evenly apart circumferentially of the tire, in the outer end of each of which is formed a circular recess $E^4$. A passage $E^5$ extends from the conduit $E^2$ to each of the recesses $E^4$ and each passage is controlled by a valve F which is carried by a valve stem F′ having a thread formed thereon which engages with a thread formed in the nipple G which nipple is screwed into the casting E, and located between the casting E and the valve and nipple, is a compressible packing material H, such as cork, to hold the air from escaping when the valves F are open.

Mounted on one end of each of the valve stems F′ is a spur gear wheel I which is rotated by a rack J′ mounted on a band J, which band extends entirely around the rim B and is preferably mounted on a laterally extending flange $E^6$ of the casting E. The band J is also provided with a rack $J^2$ formed on one edge thereof, and a spur gear wheel K meshes with the rack $J^2$ to rotate the band J to open and close the valves F, as will be readily understood. The wheel K is mounted on a rod M which is supported at its upper end by a bracket L, and the lower end of which extends through the band B, and felly A, and is formed with a square end M′ to permit the rod to be turned by means of a wrench.

N, indicates a metal tube provided with a cap $N^2$ at its outer end which tube extends through the felly into the casting E and is secured thereto by ribs N′, and is in open communication with the conduit $E^2$. This tube serves to hold the casting E to the rim B.

O, indicates a metal shield which is semi-circular in cross section and is made in two or more sections to permit them to be placed on the rim, and extends circumferentially and covers the casting E as shown, its edges resting on the surface B′ of the rim. This shield is provided with openings O′ to register with the recesses $E^4$ in the casting E.

The spur gear I is provided with a recess I′, and the valve rod F′ is provided with a pin $F^2$ which abuts one wall formed by the recess as shown, and a spring P abuts the pin $F^2$ and the opposite wall of the recess I′, and, therefore, when the rack J is turned, movement is transmitted to the gear wheel I through the pin $F^2$ and spring P in the act of closing the valve F, so that should one valve seat slightly in advance of another, the rack can still be rotated far enough to close the other valves, the springs P being compressed more or less to permit this action.

After the mechanical parts have been assembled, the sacks D are fastened to the portions E³ by placing the tubular extensions D' into the nuts D² and then forcing the nipple D³ into position to clamp the portions D' between the nipple D³ and nut D², as will be readily understood. After the sacks have all been fastened in the respective recesses E⁴ with their ends in proper relative position to each other, the rod M is turned to open the valves F and the shoe C is then placed in position over the sacks and fastened to the rim B. The cap N² is removed from the pipe N and an air pump is connected thereto and air forced into the conduit E² and flows therefrom through the respective passages E⁵ into the sacks D until they are fully inflated under proper pressure. The rod M is then turned to operate the valves F to close each of the passages E⁵.

In case one of the sacks D should become punctured, the sacks on each side thereof would immediately expand due to the air pressure contained therein and fully collapse the punctured sack and would occupy the space formerly occupied by the punctured sack, thus keeping a completely expanded shoe, as will be clearly understood.

I claim as new:

1. A tire comprising a plurality of flexible sacks, means comprising a conduit and passages in open communication therewith whereby said sacks may be simultaneously filled with air, and mechanical means for positively opening and closing communication between said conduit and said sacks simultaneously, comprising a common rigid actuator, a plurality of actuated elements operating directly upon said passages and a connection between the common actuator and the actuated elements permitting a relative advance movement therebetween.

2. A tire comprising a plurality of flexible sacks, means comprising a conduit and passages in open communication therewith whereby said sacks may be simultaneously filled with air, and entirely mechanical means for simultaneously and positively opening and closing communication between said conduit and said sacks, comprising a separate valve for each passage and a common rigid actuator for said valves.

3. A tire comprising a plurality of flexible sacks, means comprising a conduit and passages in open communication with the sacks, whereby said sacks may be filled with air, and entirely mechanical means for simultaneously closing communication between said conduit and said sacks, comprising a plurality of valves, a common rigid actuator for said valves, and a yielding connection between the actuator and each of the valves.

4. A tire comprising a circular metal conduit having passages extending therefrom, valves controlling said passages, a flexible sack mounted on said conduit in open communication with each of said passages, means for operating said valves to open and close said passages, and an arched metallic annular shield overlying said conduit and serving to support said sacks.

5. A tire comprising a plurality of flexible sacks, means comprising a conduit and passages in open communication with the sacks whereby the latter may be filled with air, means for simultaneously closing communication between said conduit and said sacks comprising a plurality of valves, pinions mounted on said valves, and a single member having a plurality of racks thereon for operating all of said pinions.

6. A tire comprising a plurality of flexible sacks, means comprising a conduit and passages in open communication with the sacks whereby the latter may be filled with air, means for simultaneously closing communication between said conduit and said sacks comprising a plurality of valves, pinions mounted on said valves, yieldable connections between said pinions and valves, and a single member having a plurality of racks thereon for operating all of said pinions.

7. A tire comprising a plurality of flexible sacks, means comprising a conduit communicating with said sacks whereby the latter may be simultaneously inflated, and entirely mechanical means for simultaneously closing communication between said conduit and said sacks comprising a separate valve for each sack, and a common circumferentially movable actuator for said valves.

Signed at New York city, in the county of New York, and State of New York this 7th day of May A. D. 1912.

GEORGE V. BAILLARD.

Witnesses:
    MANUEL M. VOIT,
    WALTER L. REEBURNE.